(12) United States Patent
Rogers et al.

(10) Patent No.: US 6,331,854 B1
(45) Date of Patent: Dec. 18, 2001

(54) METHOD AND APPARATUS FOR ACCELERATING ANIMATION IN A VIDEO GRAPHICS SYSTEM

(75) Inventors: Philip J. Rogers, Pepperell; Xiaoqing Wu, Dracut, both of MA (US)

(73) Assignee: Azi International SRL, Christ Church (BB)

( * ) Notice: Subject to any disclaimer, the term of this patent is extended or adjusted under 35 U.S.C. 154(b) by 0 days.

(21) Appl. No.: 09/166,033

(22) Filed: Oct. 5, 1998

(51) Int. Cl.$^7$ .................................................. G06T 15/70
(52) U.S. Cl. ................................. 345/473; 345/522
(58) Field of Search ................................. 345/473, 474, 345/443, 522, 213, 452

(56) References Cited

U.S. PATENT DOCUMENTS

| | | | |
|---|---|---|---|
| 4,952,051 | * | 8/1990 | Lovell et al. ........................... 352/87 |
| 5,657,478 | * | 8/1997 | Recker et al. ........................ 395/503 |
| 5,664,163 | * | 9/1997 | Yutaka et al. ........................ 345/522 |
| 5,692,117 | * | 11/1997 | Berend et al. ........................ 345/452 |
| 5,928,339 | * | 7/1999 | Nishikawa ............................... 710/26 |
| 5,969,728 | * | 10/1999 | Dye et al. .............................. 345/515 |
| 5,977,965 | * | 11/1999 | Davis, III et al. .................... 345/473 |
| 5,982,350 | * | 11/1999 | Hekmatpour et al. ............... 345/113 |
| 5,999,194 | * | 12/1999 | Brunelle ................................. 345/473 |
| 6,100,906 | * | 8/2000 | Asaro .................................... 345/508 |

* cited by examiner

Primary Examiner—Cliff N. Vo
Assistant Examiner—Huedung X. Cao
(74) Attorney, Agent, or Firm—Vedder, Price, Kaufman & Kammholz

(57) ABSTRACT

A method and apparatus for accelerating animation in a video graphics system is accomplished by storing drawing operations for a first scene in a bus master buffer. The first scene is to be drawn to a first frame. A frame flip operation is then stored in the bus master buffer at a location subsequent to the drawing operations for the first scene such that when accessed by a graphics processor, the frame flip will be performed after the drawing operations for the first scene have completed. Drawing calculations for a second scene to be drawn to a second frame are performed, and the resulting drawing operations are stored in the bus master buffer at a location subsequent to the page flip operation. The graphics processor is signaled, and the graphics processor fetches and executes the commands in the bus master buffer sequentially such that the drawing operations to the first frame are performed first, followed by the frame flip operation and finally the drawing operations to the second frame.

17 Claims, 3 Drawing Sheets

METHOD AND APPARATUS FOR ACCELERATING ANIMATION IN A VIDEO GRAPHICS SYSTEM

FIELD OF THE INVENTION

The invention relates generally to video graphics processing and more particularly to a method and apparatus for accelerating animation in a video graphics system.

BACKGROUND OF THE INVENTION

Computers are used in many applications. As computing systems continue to evolve, the graphical display requirements of computing systems become more demanding. This is especially true in applications that include video graphics animation. Animation is achieved by tricking a user's visual sense into perceiving movement on a screen by displaying successive images that differ slightly from the preceding images. If the successive images are displayed in rapid sequence, the user will not perceive any "jumpiness" or "jittering" on the screen. The successive static images will blend smoothly from the user's viewpoint, and movement will be perceived.

The successive images for animation in computer systems are typically achieved using two frames. The first frame is displayed while the second frame is updated with new drawing commands. When drawing to the second frame is completed, the second frame becomes the displayed frame, and modification of the first frame begins. Switching one frame to the display frame and the other to the drawing frame is known as "page flipping". Once the drawing to the first frame is completed, the frames are flipped back to the state where the first frame is displayed and the second is modified. This repetitive updating and flipping achieves the stream of successive images required for animation.

If a large number of objects on the screen are moving simultaneously, the computer system may require a large amount of processing resources in order to produce the successive images required for the animation. This is especially true in complex computer games involving a large number of detailed graphical entities that move independently. If the processor issues a set of commands to modify the drawing frame, followed by a command to perform a page flip, there may be a substantial delay before the actual page flip occurs. This is because a graphics processor in the system must process the drawing commands and modify the drawing frame before the flip command can execute. The flip cannot occur before the drawing commands are completed, and if the flip is executed prematurely, display errors will result.

Because the frame being displayed cannot be modified, once the processor has issued the commands to modify the drawing frame, it may have to wait for the screen flip to occur before issuing drawing commands with respect to the current display frame. When the processor is forced to wait for the graphics processor to complete drawing commands or a frame flip, the efficiency of the system is compromised. Delays experienced by the processor translate into overall slowdowns in the execution of the program. Delays can also produce noticeable aberrations in the animation, which result when one frame is displayed for an extended period before the successive frame replaces it.

Consequently, a need exists for a system that allows the processor to transfer drawing commands and frame flips to the graphics processor in a faster, more efficient manner.

DETAILED DESCRIPTION OF A PREFERRED EMBODIMENT OF THE INVENTION

Figure 1:
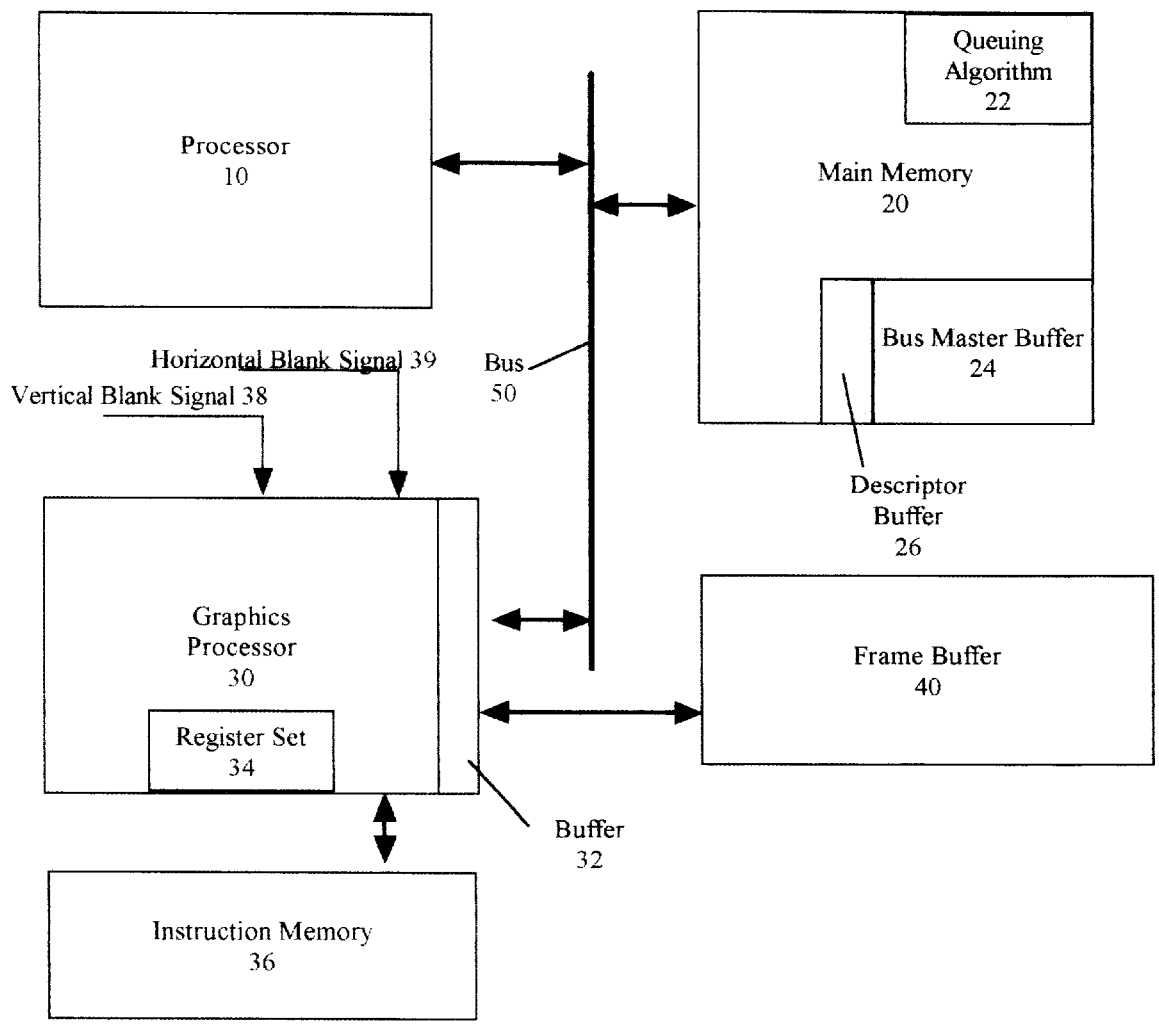
FIG. 1 illustrates a block diagram of a video graphics system in accordance with the present invention.

Generally, the present invention provides method and apparatus for accelerating animation in a video graphics system. This is accomplished by storing drawing operations for a first scene in a bus master buffer. The first scene is to be drawn to a first frame. A frame flip operation is then stored in the bus master buffer at a location subsequent to the drawing operations for the first scene such that when accessed by a graphics processor, the frame flip will be performed after the drawing operations for the first scene have completed. Drawing calculations for a second scene to be drawn to a second frame are performed, and the resulting drawing operations are stored in the bus master buffer at a location subsequent to the page flip operation. The graphics processor is signaled, and the graphics processor fetches and executes the commands in the bus master buffer sequentially such that the drawing operations to the first frame are performed first, followed by the frame flip operation and finally the drawing operations to the second frame. By creating a bus master buffer which stores frame flip operations as well as the drawing operations for both frames in an animation system, ordering of the drawing operations with respect to the frame flip operations can be ensured. Queuing all of these operations in the bus master buffer allows the processor to perform other tasks while the graphics processor fetches and executes the operations. This offloading of the processor improves the overall speed of the video graphics system by avoiding wait states that are typically encountered by processors in prior art systems.

Figure 2:
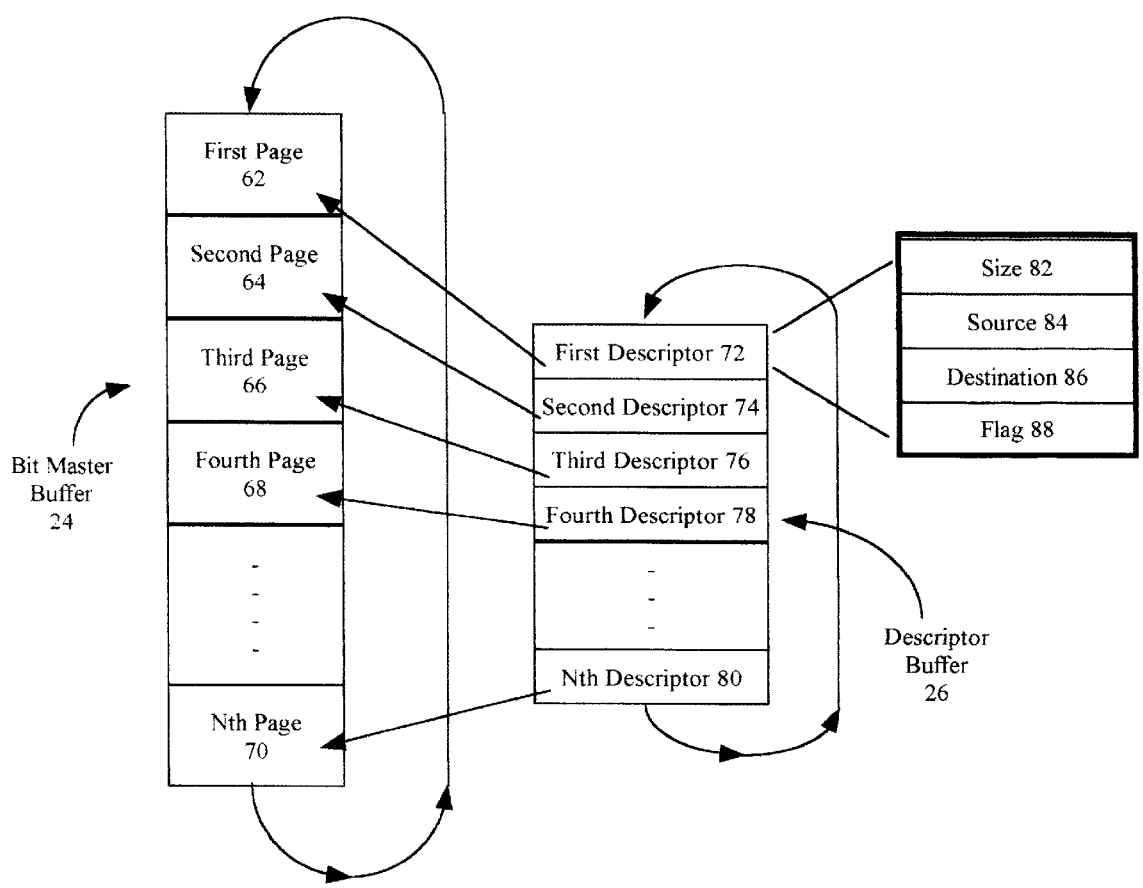
FIG. 2 illustrates a block diagram that illustrates memory structures utilized in a video graphics system in accordance with the present invention.
Figure 3:
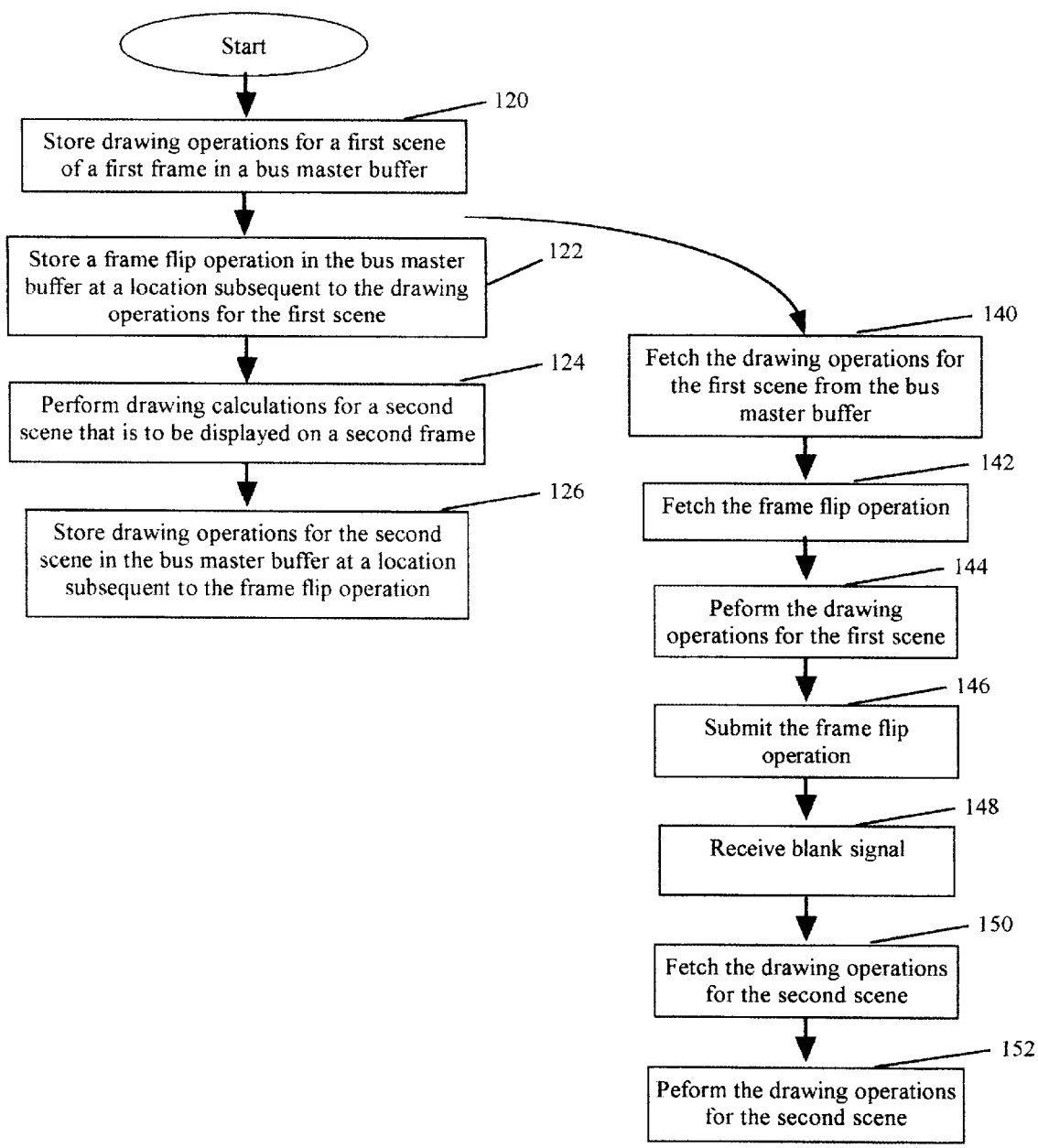
FIG. 3 illustrates a flow chart of a method for accelerating animation in accordance with the present invention.

The present invention can be better understood with reference to FIGS. 1–3. FIG. 1 illustrates a video graphics system that includes a processor 10, a main memory 20, a graphics processor 30, an instruction memory 36, and a frame buffer 40. Preferably, the graphics processor 30 is coupled to the processor 10 and main memory 20 via bus 50. The processor 10 may have additional connections to the main memory 20.

The main memory 20 may include a number of memory blocks including, but not limited to, random access memory (RAM), read only memory (ROM), and hard drive storage. The main memory 20 includes a bus master buffer 24 that facilitates direct memory access (DMA) transfers between the main memory 20 and the graphics processor 30. DMA transfers allow the graphics processor 30 to become the controller of the bus 50, or "bus master". When the graphics processor 30 is the bus master, it is able to perform direct transfers of data to and from the main memory 20. These DMA transfers are typically much more efficient than if the processor 10 were required to perform the transfers.

Preferably, the bus master buffer 24 is made up of a number of pages, where each page maps to a set of physical addresses in the main memory 20. The structure of the bus master buffer 24 can be better understood with reference to FIG. 2. FIG. 2 illustrates a bus master buffer 24 having N pages, where N is a number. The number of pages in a particular system is based on the preferred page size and the amount of memory the system can allocate to the bus master buffer. Preferably, the bus master buffer 24 is implemented as a circular buffer such that after the Nth page 70 of the buffer is accessed, the next page that is accessed will be the first page 62.

The pages of the bus master buffer 24 store data to be transferred via DMA transfer. In one embodiment, DMA transfers can only be initiated by the graphics processor 30 based on physical addresses within the main memory 20. This is because virtual memory address translation is not available for DMA transfers. For this reason, the bus master buffer 24 is initially set up by requesting physical memory space from the processor 10. If the processor 10 denies the original memory request, smaller blocks of memory may be requested, which may reduce the number of pages in the bus master buffer 24. Preferably, the pages in the bus master buffer 24 are 4 K bytes in size, and the number of pages (N) in the bus master buffer 24 is a number corresponding to a power of two. In one embodiment there are 1024 pages. It should be apparent that many different page sizes and many different numbers of pages may be appropriate and desirable in different systems.

In order to better utilize the bus master buffer 24, a descriptor buffer 26 may be utilized. The descriptor buffer 26 includes a plurality of descriptors, with each descriptor corresponding to a page in the bus master buffer 24. Because the bus master buffer 24 may require physical addresses in the main memory 20, and a sequential block of memory large enough to accommodate the entire bus master buffer 24 may not be available, the pages of the bus master buffer 24 may be scattered about the main memory 20. The descriptor buffer 26 provides a maintenance function in that it keeps track of where each of the pages of the bus master buffer 24 are located in physical memory.

FIG. 2 illustrates the relationship between the descriptor buffer 26 and the bus master buffer 24. The descriptor buffer 26 is a circular buffer such that after the Nth descriptor 80 is accessed, the next descriptor to be accessed is the first descriptor 72. The first descriptor 72 corresponds to the first page 62 of the bus master buffer 24. Similarly, each of the other descriptors of the descriptor buffer 26 corresponds to one of the pages of the bus master buffer 24.

The preferred structure of a descriptor is illustrated with respect to the first descriptor 72. A descriptor includes a size 82, a source address 84, a destination address 86, and a flag 88. The source address 84 describes the location of the corresponding bus master buffer page in memory. The destination address 86 describes the location to which the data in the corresponding page is to be transferred. The size indicates the number of bytes of data to be transferred. For a command data set, the size would be based on the number of registers to be filled. For other data sets to be fetched by the graphics processor 30, the size of a single page may not be adequate. In such cases, the flag 88 may be included to indicate that there is overflow into the next page. If the flag 88 is set, the data block to be transferred is continued in the next page of the bus master buffer, which is described by the subsequent descriptor.

For example, if the first page 62 stores a set of command data which draws an element, the descriptor 72 will contain a size 82 corresponding to the size of the portion of the register set 34 being written, the source 84 will point to the first page 62 in memory, and the destination 86 will point to the register set 34. In one embodiment, the flag 88, which may be a single bit, will not be set as the command set fits within the first page 62. If the next entity stored in the bus master buffer 24 is a data set that is so large that it requires three pages of memory, it will be stored in the second page 64, the third page 66, and the fourth page 68. The second and third descriptors 74 and 76 will have their respective flag bits set, indicating in each case that the next descriptor contains a continuation of the data set. The fourth descriptor 78, however, will not have the flag bit set, as it points to the final page that stores a portion of the data set.

Returning to FIG. 1, the processor 10 achieves animation by producing command data that results in graphical data being drawn to two frames, or surfaces. The two frames are stored in the frame buffer 40. One frame is displayed by the system while the other frame is updated with new graphical data. The frame that is currently being displayed is referred to as the display frame, and the frame that is being updated referred to as the drawing frame. A register in the system, the display frame register, stores a value indicating which of the two frames is the current display frame. Similarly, a drawing frame register indicates which of the two frames is the current drawing frame.

When updates to the current drawing frame have completed, the display frame register and the drawing frame register are updated such that the display frame and the drawing frame are swapped or flipped. This is referred to as a page flipping or a frame-flip operation. Thus, the frame that was most recently displayed becomes the new drawing frame and vice versa. This frame flipping must be coordinated with the drawing operations, or graphical data may be written to the frame that is being displayed.

The processor 10 typically performs a number of calculations and other operations in order to determine the command data to issue to the graphics processor for a particular frame. If the user is playing a game, the computer needs to determine what the next scene will look like—bullets may be in flight, monsters may be moving, the player's perspective may be changing, etc—In order to determine the next scene, the processor 10 may accept input from the user, which includes such actions as polling a keyboard, reading values from a joystick or mouse, and receiving data over a network. The processor 10 can use this input in conjunction with the present state to determine a response that will make up the next state. Preferably, the computer has a three-dimensional geometric representation that represents the current state of the "world" within the game or application. This three-dimensional representation is translated into a two-dimensional representation for display.

If there are many drawing commands for a particular frame, the processor 10 may buffer, or queue, the commands in the bus master buffer 24. This allows the processor 10 to go off and perform other tasks while it waits for the drawing commands to be executed. Preferably, drawing commands are executed by storing a set of command data in a register set 34 of the graphics processor 30. In order to simplify the transfer of data to this register set 34, the data for the set of registers may be stored sequentially in the bus master buffer 24 such that the data can be transferred to the register set 34 in a single block DMA transfer.

In order to facilitate transfer of a group of register values using such a technique, the data to be transferred to the register set is described with a starting point, a corresponding number of registers that will be filled, and the values for the registers. This description allows the block transfer of the register values to be accomplished using a DMA transfer and saves a great deal of processor bandwidth, as the processor does not have to write the values to each register individually.

As stated above, the processor 10 stores command data in the bus master buffer 24 for the drawing commands. Problems can arise when the processor 10 finishes storing command data for a frame and wishes to initiate a frame flip. In prior art systems, the frame flip was accomplished by the processor 10 writing new values directly to the display frame register and the drawing frame register. However, writing these registers causes the two frames to flip immediately upon receipt of the vertical blank signal 38. The graphics processor 30 receives the vertical blank signal 38 when the display scanner completes scanning the last row of the display and is resetting to the display's top row. By performing the frame flip at this time, corruption of the scanning process is avoided.

Potential problems exist when the processor 10 directly alters the display frame register and the drawing frame register. This is because drawing commands affecting the current drawing frame that have been stored in the bus master buffer 24 may not yet have been executed when the processor 10 causes the frame flip to occur. If the frame flip occurs before the commands are executed, drawing operations may be performed to the display frame, which causes corrupted results to be displayed.

In order to avoid these problems, the frame flip operation is stored in the bus master buffer 24 along with the drawing operations. The graphics processor 30 fetches the commands and data in the bus master buffer 24, and these commands are then executed sequentially. Therefore, if the frame flip operation is stored subsequent to all of the drawing operations affecting the current drawing frame, the timing of the frame flip operation will never precede the completion of these drawing operations. Similarly, if the drawing operations for the current display frame are stored subsequent to the frame flip operation, the frame flip operation will be completed and the current display frame will become the drawing frame before these commands are executed. In order to achieve these results, the processor 10 reads and executes the queuing algorithm 22 that is stored in the main memory 20. The queuing algorithm 22 is typically implemented in software. When executed, the queuing algorithm 22 causes the processor 10 to operate in a specific and predetermined manner to perform a set of functions. First, the processor 10 queues a first set of command data in the bus master buffer 24. The first set of command data includes data that performs at least one drawing operation that affects the current drawing frame. The first set of command data can include a large number of drawing operations, where the drawing operations are intended to prepare the current drawing frame for display immediately after the current display frame. In some cases, the first set of command data may not contain any drawing operations. In this case a placeholder may be inserted in the bus master buffer 24, or the presence of the first set of command data may be omitted.

Once the processor 10 has queued the first set of command data, the processor 10 queues the frame flip operation in the bus master buffer. Following this, the processor 10 queues a second set of command data that will alter the current display frame once it becomes the next drawing frame as a result of the frame flip operation The second set of command data includes data that will draw at least one element to the frame, and may include a plurality of such drawing operations.

Once the processor 10 has stored some or all of this data in the bus master buffer 24, it signals the graphics processor 30 to begin fetching and executing the data in the bus master buffer 24. The graphics processor 30 executes a drawing algorithm stored in the instruction memory 36 that causes it to perform the functions necessary to accomplish these tasks. Once the graphics processor 30 has been signaled by the processor 10 that there is data in the bus master buffer 24 to be fetched, the graphics processor 30 fetches the data stored in the bus master buffer 24. Preferably, this is accomplished through a DMA transfer initiated by the graphics processor 30 as described above.

The graphics processor 30 may include a buffer 32 to allow for large blocks of data to be fetched from the bus master buffer 24. The fetched data can be stored in the buffer and operated on by the graphics processor 30 when it is able. This can be advantageous if it is difficult to gain bus master access to the bus 50, as a single DMA operation could transfer larger portions of data from the bus master buffer 24.

After prompting by the processor 10, the graphics processor 30 will take control of the bus 50 and fetch the first set of command data, the frame flip operation, and the second set of command data from the flame buffer 24. The fetching may occur during a single DMA operation, or it may occur over a number of DMA operations. The important factor is the in which stored data is acted upon.

The graphics processor 30 operates on the data fetched from the bus master buffer 24 in a sequential manner such that the first set of drawing operations is executed first. Following the completion of these operations, the frame flip operation is executed such that the display frame register and the drawing frame registers are updated at the next receipt of the vertical blank signal 38. Once the frame flip operation has completed, the graphics processor 30 can begin to execute the drawing operations of the second set of command data. These steps ensure that the drawing operations are not performed prior to the successful completion of the flame flip operation, which ensures that the drawing operations do not alter the display frame. Altering the display frame while it is being displayed results in display errors.

In another embodiment, the vertical blank signal is not awaited prior to flipping the display, instead the horizontal blank signal is awaited allowing for a page flip at the beginning of the next horizontal line of the display scan. This allows for a faster frame rate, with some horizontal tearing of the image. For typical immersive 3D games, users have shown a preference for page flipping on horizontal blank instead of vertical blank. In this case, the graphics processor 30 operates on the data fetched from the bus master buffer 24 in a sequential manner such that the first set of drawing operations is executed first. Following the completion of these operations, the flame flip operation is executed such that the display frame register and the drawing frame registers are updated at the next receipt of the horizontal blank signal 39. Once the frame flip operation has completed, the graphics processor 30 can begin to execute the drawing operations of the second set of command data. These steps ensure that the drawing operations are not performed prior to the successful completion of the frame flip operation, which ensures that the drawing operations do not alter the display frame. Altering the display frame while it is being displayed results in display errors.

FIG. 3 illustrates a method for accelerating animation. At step 120, drawing operations for a first scene of a first frame are stored in the bus master buffer. Preferably, the bus master buffer is similar to that described earlier in that it includes a number of pages and is arranged as a circular buffer. Data in the bus master buffer is fetched sequentially by a graphics processor for use in drawing the graphics stream. A set of descriptors as described with respect to FIGS. 1 and 2 may be included in the system to effectuate the fetching of the bus master buffer pages. When executed, the stored drawing operations will modify the first frame. To ensure that corruption of the display is prevented, the first frame is only modified when it is the drawing frame and not the display frame.

At step 122, a frame flip operation is stored in the bus master buffer at a location subsequent to the location at which the drawing operations for the first scene were stored. Because the data stored in the bus master buffer is accessed sequentially by the graphics processor of the system, the drawing operations for the first scene will be fetched and executed before the frame flip operation. Thus, the drawing operations for the first frame will be executed when the first frame is the drawing frame and the frame flip operation, which makes the first frame the display "frame will", not be executed until the drawing operations are complete.

At step 124, drawing calculations for a second scene are performed. The second scene will be displayed using a second frame or page. Therefore, drawing operations for the second scene will be executed when the second frame is the drawing frame. When the second frame is the drawing frame, the first frame is the display frame. The calculations for the second scene may be performed while the first frame is being displayed. The calculations may be based on received user input from a keyboard, mouse, or network connection as was described with respect to FIGS. 1 and 2. Similarly, an internal three-dimensional geometrical representation of a game environment may be converted to a two-dimensional representation as part of the calculation process.

At step 126, the drawing operations for the second frame that result from the calculations are stored in the bus master buffer at a location subsequent to the frame flip operation. This may include storing a plurality of drawing operations in a plurality of pages in the bus master buffer. Steps 120–126 prepare the data in the bus master buffer for fetching. The sequential storage of this data ensures that it is executed in the proper sequence, allowing drawing operations to both frames to be queued by the processor in relation to the frame flip operation. In order to ensure drawing operations are not executed prematurely by the graphics processor, the availability of the drawing operations in the bus master buffer may be conditioned on receipt of a synchronization signal indicating that a previous frame flip has occurred. Alternately, if the graphics processor is capable of stalling drawing operations until execution of a preceding frame flip operation is verified with a synchronization signal, the drawing operations may be fetched immediately from the bus master buffer. In some applications, it may be desirable to limit the number of complete frames of animation queued in the bus master buffer in order to ensure reasonable synchronization between the display and user input.

Steps 140–152 describe the fetching and execution process of the graphics processor in the system. Preferably, the fetching operations are commenced based on a signal from the system processor indicating that data in the bus master buffer is ready to be fetched. In the scenario illustrated in FIG. 3, the fetching may begin as soon as drawing operations for the first frame are stored or at any time thereafter.

At step 140, the drawing operations for the first scene are fetched from the bus master buffer. Preferably, fetching is accomplished through a DMA transfer initiated by the graphics processor. In order to fetch the data, the graphics processor may read a descriptor such as those described with respect to FIG. 2. The descriptor will indicate the source location of the data in the memory, the amount of data to be transferred, and the destination address for the data.

At step 142 the page flip operation is fetched from the bus master buffer. At step 144, the drawing operations fetched in step 140 are executed. This execution may also occur before the frame flip operation is fetched. Once the drawing operations for the first scene have been fetched and executed fully, the frame flip operation is submitted for execution at step 146. The frame flip will occur at the next vertical or horizontal blank signal as described above.

At step 148, the vertical or horizontal blank signal is received indicating that drawing to the second scene may commence At step 150, the drawing operations for the second scene are fetched. At step 152, the drawing operations for the second scene are executed. The drawing and flipping process is repeated continuously to achieve animation in the system.

FIG. 3 illustrates a queuing method that can be used to ensure that frame flips and drawing operations are executed in the proper order. By queuing the frame flip operations in the same queue as the drawing operations, problems with ordering of the drawing operations with respect to the frame flips are avoided. The queuing, or buffering, allows the processor in the system to store a number of video graphics operations or commands in the bus master buffer and then go about other tasks without having to wait or monitor the progress of the graphics processor.

The present invention provides a method and apparatus for sequencing drawing operations and frame flip operations in a video graphics system. By intermingling the drawing operations with the frame flip operations in a buffered system, the ordering of operations will not be altered while still allowing the system processor to be offloaded. The offloading of the processor allows it to begin calculations for the next set of drawing operations, which can result in faster, smoother video graphics animation. The buffering also allows for data to be transferred to a graphics processor via a DMA transfer, which allows registers and data sets to be updated and stored more rapidly than through conventional read/write transfers of data. By using the method and apparatus herein, the speed of systems using graphical processors for graphical displays can be increased without inducing errors or aberrations.

Software algorithms that cause a processor or controller to perform the functions of the methods illustrated herein may be stored in "any " computer readable medium, including, but not limited to, a diskette, magnetic tape, ROM, RAM, a hard disk, or a CD-ROM. Execution of the software by a processor will cause the processor to operate in a specific and predetermined manner such that it performs the steps or functions required by the methods described above. In some embodiments, circuitry or hardware may perform some or all of the steps or functions, whereas other steps or functions are performed in software.

It should be understood that the implementation of other variations and modifications of the invention in its various aspects will be apparent to those of ordinary skill in the art, and that the invention is not limited by the specific embodiments described For example, the bus master buffer may be implemented in a separate distinct memory apart from the main memory of the system such that the descriptors can be incorporated into the sequential pages of the bus master buffer. It is therefore contemplated to cover by the present invention, any and all modifications, variations, or equivalents that fall within the spirit and scope of the basic underlying principles disclosed and claimed herein.

What is claimed is:

1. A method for accelerating animation comprising:

storing drawing operations for a first scene in a bus master buffer, wherein the first scene is to be drawn to a first frame;

storing a frame flip operation in the bus master buffer at a location subsequent to the drawing operations for the first scene such that when accessed by a graphics processor, the frame flip operation will be performed subsequent to the drawing operations for the first scene by swapping a second frame for the first frame;

performing drawing calculations for a second scene, wherein the second scene is to be drawn in the second frame;

storing drawing operations for the second scene in the bus master buffer at a location subsequent to the frame flip operation; and signaling the graphics processor that data is present in the bus master buffer wherein, in response to the signaling, the graphics processor performs the steps of:

fetching the drawing operations for the first frame, the frame flip operation, and the drawing operations for the second frame from the bus master buffer;

executing the drawing operations for the first frame by displaying the first frame; and executing the frame flip operation by swapping the first frame and the second frame such that the second frame drawing operations are executed and the first frame drawing operations can be updated.

2. The method of claim 1, wherein the step of executing further comprises waiting for a vertical blank signal before executing the drawing operations for the second scene.

3. The method of claim 1, wherein the step of executing further comprises waiting for a horizontal blank signal before executing the drawing operations for the second scene.

4. The method of claim 1, wherein the step of fetching further comprises fetching the drawing operations for the first frame, the frame flip operation, and the drawing operations for the second scene from the bus master buffer using a direct memory access transfer initiated by the graphics processor.

5. The method of claim 4, wherein storing drawing operations for the second scene in the bus master buffer further comprises storing a plurality of drawing operations in a plurality of pages in the bus master buffer.

6. The method of claim 5, wherein performing drawing calculations for the second scene further comprises performing drawing calculations for the second scene when the first frame is displayed.

7. The method of claim 6, wherein performing drawing calculations further comprises translating a three-dimensional geometrical representation to a two-dimensional representation.

8. A video graphics processing system comprising:

a first memory, wherein the first memory includes a bus master buffer and stores a queuing algorithm;

a processor coupled to the first memory, wherein the processor executes the queuing algorithm such that it causes a processor to operate in a specific and predetermined manner to perform the functions of:

queuing a first set of command data in the bus master buffer, wherein the first set of command data is used to draw at least one element to a first frame;

queuing a frame flip operation in the bus master buffer wherein the frame flip operation is used to swap the first set of command data and a second set of command data; and queuing the second set of command data in the bus master buffer, wherein the second set of command data is used to draw at least one element to a second frame;

a second memory storing a drawing algorithm; and a graphics processor coupled to the first memory, the second memory, and a processor, wherein the graphics processor executes the drawing algorithm such that it causes the graphics processor to operate in a specific and predetermined manner to perform the functions of:

fetching the first set of command data;

fetching the frame flip operation;

drawing to the first frame utilizing the first set of command data;

when the drawing to the first frame is complete, executing the frame flip operation by swapping the first set of command data and the second set of command data;

receiving a vertical blank signal, wherein the vertical blank signal indicates that the frame flip operation has completed; and when the vertical blank signal has been received, drawing to the second frame utilizing the second set of command data.

9. The apparatus of claim 8, wherein the bus master buffer includes a plurality of bus master buffer pages.

10. The apparatus of claim 9 further comprises a bus operably coupled to the processor, the first memory, and the graphics processor, wherein the graphics processor acquires control of the bus during fetching operations.

11. The apparatus of claim 10 further includes a descriptor buffer that includes a plurality of descriptors, wherein each descriptor of the descriptor buffer corresponds to a bus master buffer page of the plurality of bus master buffer pages, and wherein each descriptor of the plurality of descriptors stores a size value, a source location, and a destination location for a corresponding bus master buffer page.

12. The apparatus of claim 11, wherein each descriptor further stores a flag, wherein the flag indicates whether a stored bus master operation is continued in a subsequent descriptor.

13. The apparatus of claim 8, wherein the graphics processor includes a buffer, wherein the graphics processor stores a portion of fetched queued data in the buffer while performing operations using a preceding portion of the fetched queued data.

14. The apparatus of claim 13, wherein the graphics processor includes a set of registers, wherein fetched command data is stored in the set of registers.

15. The apparatus of claim 14 further includes a frame buffer, wherein the first frame and the second frame are stored in the frame buffer.

16. The apparatus of claim 15, wherein each of the first and second sets of command data includes a corresponding starting point, a corresponding number of registers, and a set of register values.

17. The apparatus of claim 8, wherein the queuing algorithm is further configured such that when the processor executes the queuing algorithm it causes the processor to operate in a specific and predetermined manner to perform the function of signaling the graphics processor that data in the bus master buffer is ready to be fetched.

* * * * *